(12) United States Patent
Freimark

(10) Patent No.: US 7,433,987 B2
(45) Date of Patent: Oct. 7, 2008

(54) COMPUTER APPARATUS FOR INTERCONNECTING AN INDUSTRY STANDARD COMPUTER TO A PROPRIETARY BACKPLANE AND ITS ASSOCIATED PERIPHERALS

(75) Inventor: Ronald J. Freimark, Scotsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 399 days.

(21) Appl. No.: 11/136,595

(22) Filed: May 23, 2005

(65) Prior Publication Data

US 2005/0278468 A1 Dec. 15, 2005

Related U.S. Application Data

(60) Provisional application No. 60/579,932, filed on Jun. 14, 2004.

(51) Int. Cl.
*G06F 3/00* (2006.01)
(52) U.S. Cl. .......................................... 710/300; 710/64
(58) Field of Classification Search ............ 710/62, 710/64, 300, 301, 305, 315, 105
See application file for complete search history.

(56) References Cited

U.S. PATENT DOCUMENTS

| | | | | |
|---|---|---|---|---|
| 5,457,784 A * | 10/1995 | Wells et al. | ..................... | 710/9 |
| 5,805,844 A | 9/1998 | Gustin et al. | | |
| 5,818,736 A * | 10/1998 | Leibold | ...................... | 703/16 |
| 5,867,673 A | 2/1999 | Gustin et al. | | |
| 6,029,181 A * | 2/2000 | Milakovich et al. | ......... | 715/523 |
| 6,073,201 A * | 6/2000 | Jolley et al. | ................. | 710/315 |
| 6,073,229 A * | 6/2000 | Crane et al. | ................... | 712/33 |
| 6,247,078 B1 * | 6/2001 | Ebert et al. | ................. | 710/301 |
| 6,735,660 B1 * | 5/2004 | Osten et al. | ................. | 710/305 |
| 6,904,530 B2 * | 6/2005 | Frank | ......................... | 713/300 |
| 7,137,011 B1 * | 11/2006 | Harari et al. | ................ | 713/189 |

* cited by examiner

*Primary Examiner*—Khanh Dang
(74) *Attorney, Agent, or Firm*—Ohlandt, Greeley, Ruggiero & Perle, LLP

(57) ABSTRACT

A computer apparatus that interconnects a standard commercial off the shelf (COTS) computer to a proprietary system. The standard COTS computer replaces a proprietary computer and assumes its roles of controlling a workstation and a display thereof of the proprietary system. The computer apparatus comprises a frame that carries the COTS computer, a power converter, adapters, a video module, Ethernet and UBS connectors, a hard drive and the like. The frame mates with slots of a backplane of the proprietary system.

5 Claims, 5 Drawing Sheets

COMPUTER APPARATUS FOR INTERCONNECTING AN INDUSTRY STANDARD COMPUTER TO A PROPRIETARY BACKPLANE AND ITS ASSOCIATED PERIPHERALS

RELATED APPLICATION

This application claims the benefit of U.S. Provisional Patent Application Ser. No. 60/579,932, filed Jun. 14, 2004, the entire contents of which are hereby incorporated by reference.

FIELD OF THE INVENTION

This invention relates to the field of distributed control networks and more particularly relates to improvements in the interconnection of commercially available computer hardware components in a proprietary system and network.

BACKGROUND OF THE INVENTION

A distributed process control system, such as Honeywell Inc.'s TDC3000, provides a computerized plant management system, a version of which is described and claimed in U.S. Pat. No. 4,607,256, which issued Aug. 19, 1986. The process control system includes a universal operator station, which an operator responsible for the overall operation of the process or processes being supervised uses to obtain the information needed to perform this function. Additionally, the operator station includes the capability of transmitting information, including commands or instructions, to control subsystems of the plant management system to control the processes being supervised. All communications between the universal operator station and other modules of the network are via the network's proprietary Local Control Network (LCN) bus which provides the universal operator station with access to the data highways of any digital process control and data acquisition subsystems of the system of the plant management system.

All of the hardware and software components of the submodules of the operator station module were specially designed to perform the functions required of an operator station module such as producing a video display on a CRT, I/O functions for keyboards, printers, etc., mass storage devices, and a general purpose data processing capability for optimizing the system, for example. There has been a tremendous increase in the performance of commercially available personal computers (PCs), their associated peripheral devices, and related operating system software and with a concomitant reduction in their cost in recent years. Thus, it has become common to incorporate commercially available PCs, peripherals, and software into the peripheral submodule of a universal operator station module in place of the specialized hardware and software components of an operator station module.

U.S. Pat. No. 5,805,844 and U.S. Pat. No. 5,867,673, assigned to Honeywell Inc. (both hereby incorporated by reference), teach an improved interface circuit that permits communication via the interface circuit between the kernel submodule and the peripheral submodule of the universal operator station (OS) module in which the components of the peripheral module are standard commercially available electronic components and associated software. The improved interface circuit does so without requiring any changes to the hardware and/or software of the components of the kernel submodule, or to any of the other modules of the process control system. The kernel submodule communicates with its components and with the interface circuit over its module BUS, the structure and protocol of which is unchanged. The components of the peripheral submodule likewise communicate with one another over the peripheral component interface (PCI) BUS and with the interface circuit as well.

In this exemplary system, the kernel submodule connects to the PCI bus of a computer station connecting the peripheral components associated with the computer station, i.e. keyboard, display, pointing device to the kernel submodule. Therefore, these patents teach a system that adds an LCN interface module that connects a desktop PC computer device via the PCI bus to the LCN bus of the proprietary plant management system. The desktop PC then acts as an operator station in the plant management system.

Today, powerful general purpose computers are constructed, whereby the processor, RAM/ROM memory, mass storage, video, sound and I/O elements and components of a general purpose computer can be housed on a single board with a minimal number of small, optional, peripheral interface boards for special interconnections (e.g. special video capabilities, or LAN interfaces). Modern component boards, e.g., motherboards, can incorporate all the components required to operate such a computer, except for those components required to provide either user input to the computer or to display the output of the computer. These user operated input and output devices are typically found in the proprietary operator station described above and connected to the proprietary input/output interconnect hardware of the proprietary plant management system.

There is a need for a computer apparatus that interconnects a proprietary operator station of a proprietary plant management system to an industry standard form factor motherboard in order for the operator station to use a commercial workstation computer disposed on the motherboard to transmit information, including commands or instructions, to control subsystems of the plant management system and the processes being supervised.

SUMMARY OF THE INVENTION

A computer apparatus of the present invention connects a commercial-off the shelf (COTS) computer to a backplane of a system that includes at least one input/output (I/O) unit and a plurality of card slots for an interface to the I/O unit. The computer apparatus comprises a frame and at least one edge connector, the COTS computer and the edge connector being disposed on the frame. At least one adapter is disposed on the frame and is interconnected with the COTS computer and the edge connector. The adapter comprises circuit elements that convert input and output of signals of the COTS computer to input and output signals that are compatible with the proprietary interface so that the COTS computer provides control for the I/O unit. The edge connector mates with one of the card slots of the backplane.

In one embodiment of the present invention, the at least one adapter is a first adapter and the edge connector is a first edge connector. A second edge connector and a second adapter are disposed on the frame. The second adapter is interconnected with the COTS computer and the second edge connector.

Preferably, the first adapter and the first edge connector are disposed on a first adapter board that is mounted to and spaced from the frame. The second edge connector and the second adapter are disposed on a second adapter board. The second edge connector mates with another of the card slots of the backplane.

In another embodiment of the present invention, the frame comprises a metallic sheet comprising a first surface and a second surface substantially perpendicular to the first surface, the second surface providing support for the second adapter board.

In another embodiment of the present invention, a power converter is disposed on the frame and is interconnected with the edge connector. The COTS computer and the adapter convert power received via the edge connector from the system to power levels that are compatible with the COTS computer and the adapter.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
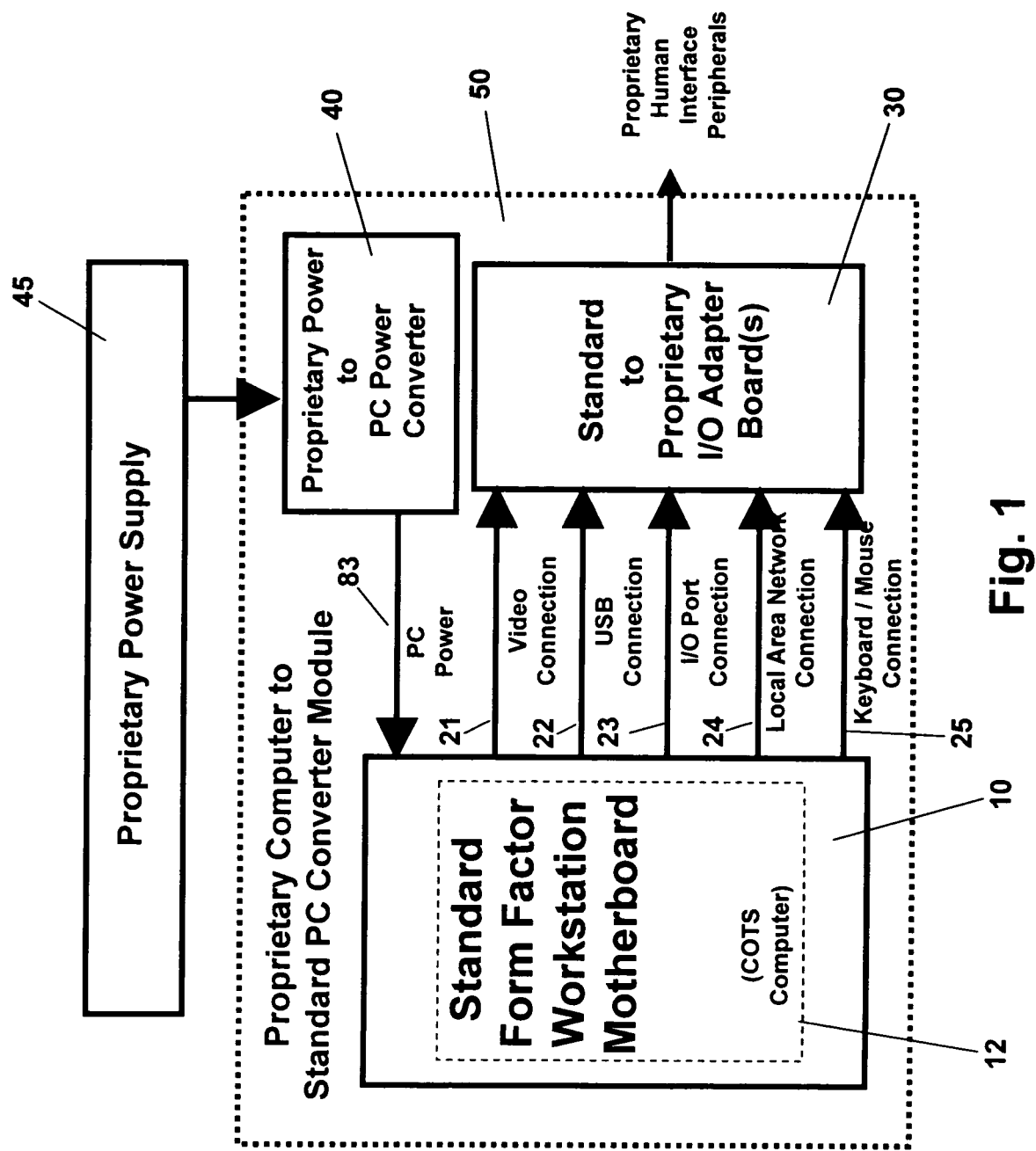
FIG. 1 is a block diagram of the computer apparatus of the present invention.

Referring to FIG. 1, a computer apparatus 50 of the present invention comprises a standard Commercial Off the Shelf (COTS) computer 12. COTS computer 12 in a preferred embodiment may be packaged in a motherboard 10 that has a standard PC form factor, such as, for example, an industry standard ATX form factor. Motherboard 10 comprises input/output (I/O) device and signal interconnects 21, 22, 23, 24 and 25 routed and interconnected to one or more I/O adapter boards 30.

Figure 2:
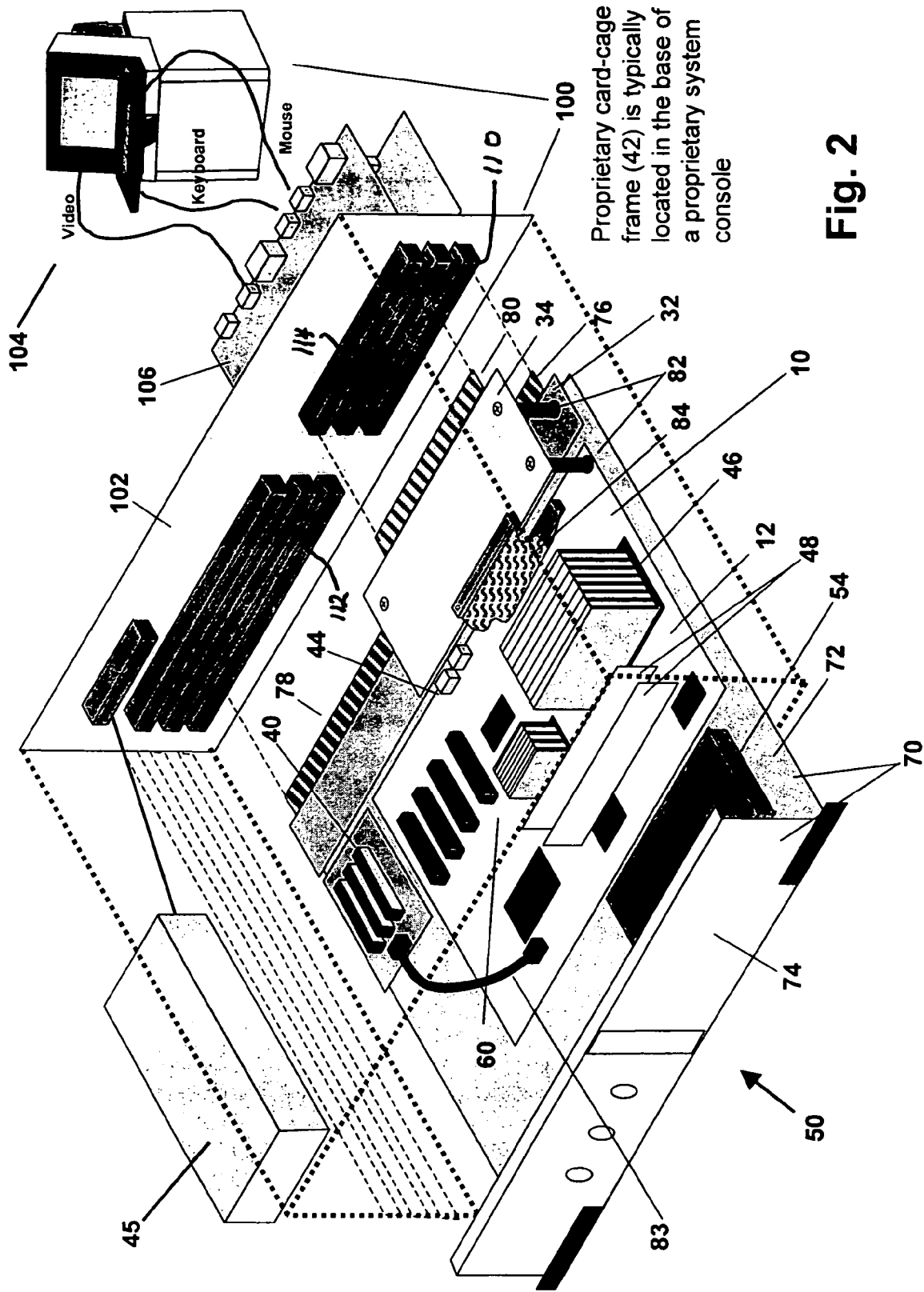
FIG. 2 is a perspective view of one embodiment of the computer apparatus of the present invention shown with a backplane of a proprietary system.

Referring also to FIG. 2, in a preferred embodiment, I/O adapter boards 30 comprise separate I/O adapter boards 32 and 34 that are disposed to communicate with a proprietary system 100 via a proprietary backplane 102. In particular, I/O adapter boards 32 and 34 function to convert input and output signals carried on signal interconnects 21-25 of motherboard 10 to input and output signals that are compatible with an I/O unit 104 of proprietary system 100. The input and output signals at the output of I/O adapter boards 32 and 34 are carried via backplane 102 and an I/O interconnect unit 106 to I/O unit 104. I/O unit 104, e.g., is a display unit comprising a display screen and one or more input units, such as a keyboard, a mouse, touchscreen, and the like. For example, I/O unit 104 may be an operator station of proprietary system 100. In order to update proprietary system 100 to current computer technology without a redesign of the entire system, a proprietary computer of proprietary system 100 has been removed for replacement by COTS computer 12. It will be appreciated by one skilled in the art that the number of I/O adapter boards 30 needed is a matter of design choice as well as a matter of the type of proprietary system.

Power to motherboard 10 upon which COTS computer 10 is disposed, is provided by a proprietary power supply 45 that also powers proprietary peripherals, such as I/O unit 104 of proprietary system 100. The power is routed on computer apparatus 50 to a power converter 40 that conforms the voltages and currents supplied to proprietary system 100 to the voltages and currents required by motherboard 10.

Figure 3:
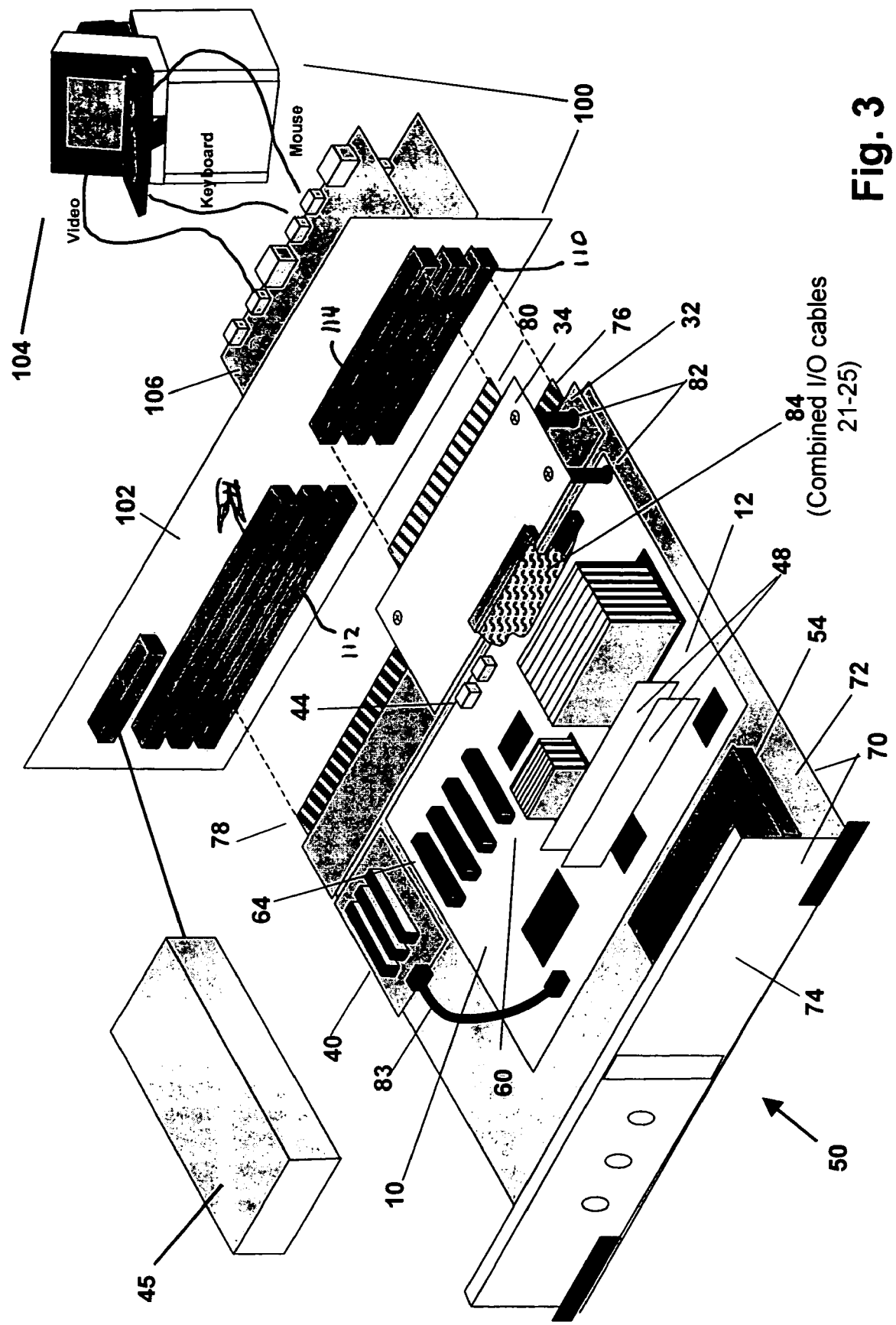
FIG. 3 is a perspective view of a rack, a backplane of a proprietary system and the computer apparatus of FIG. 2.

Computer apparatus 50, including the motherboard 10, I/O Adapter Boards 32 and 34 and power converter 40 as well as other components, preferably comprises a single pre-packaged module housed and assembled on a single or universal slot station (USS) that can be mounted within a Referring to FIGS. 2 and 3, an exemplary computer apparatus 50 is preferably configured to interface to a circuit card chassis 42 (shown in FIG. 2), which, for example, may be a TDC3000 Dual Node Module Chassis marketed by Honeywell, Inc. Circuit card chassis 42 is typically located in a base of I/O unit 104. Computer apparatus 50 includes a frame 70 that is shaped and sized to fit within circuit card chassis 42. Frame 70 comprises a sheet of rigid material that has a first surface 72 and a second surface 74 that is substantially perpendicular to first surface 72, e.g., an L-shape. Frame 70, e.g., may be constructed of sheet metal. In FIG. 3, the card guide frames have been removed. Adapter board side edge connectors 76 and 78 and adapter board edge connector 80 are connected into corresponding slot connectors 110, 112 and 114 of backplane 102, thereby connecting computer apparatus 50 to proprietary system 100.

Motherboard 10 is mounted to surface 72 of frame 70, using, for example, standoffs (not shown). Disposed on motherboard 10 are COTS computer 12, onboard dual Ethernet connectors 44, a populated microprocessor socket 46 and one or more populated RAM memory modules 48 as required to function as a general purpose computer. If an ATX form factor is used, motherboard 10 would also include an AGP socket, USB and Ethernet connectors and a plurality of PCI card sockets as well as, keyboard, mouse, serial, parallel and serial ports (none of which are shown on the drawing). A hard disk drive 54, e.g., a 7200 RPM, 2.5 inches, is also mounted to surface 72 of frame 70. Hard disk drive 54 is interconnected with COTS computer 12 on motherboard 10. Other components (not shown in FIG. 2) can also be disposed on frame 70, such as the components mentioned below.

Figure 4:
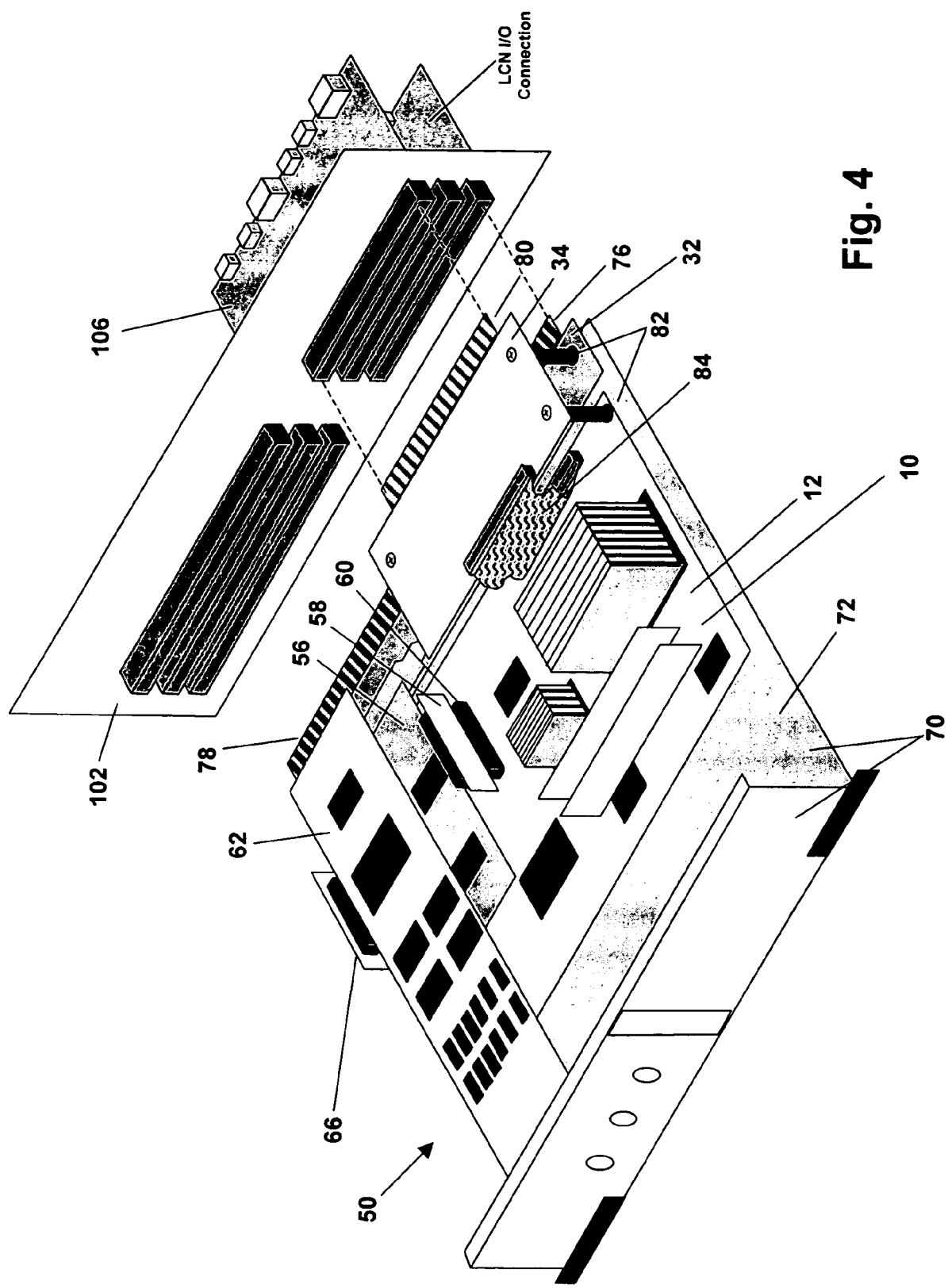
FIG. 4 is a perspective view of a portion the computer apparatus of FIG. 2 with optional modules disposed thereon.

Referring to FIG. 4, a video board 56 can optionally be mounted on standoffs horizontally over motherboard 10. A right angle riser 58 is installed in an AGP slot connector 60 that connects motherboard 10 to video board 56.

Referring to FIG. 4, a video board 56 can optionally be mounted on standoffs horizontally over motherboard 10. A right angle riser 58 is installed in an AGP slot connector 60 that connects motherboard 10 to video board 56. Video board 56 produces video signals that will be connected to and used by the display of I/O unit 104. For proprietary LCN systems an LCNP4 Co-Processor Card 62 is optionally installed over video card 56 that connects to a PCI slot connector 64 (shown in FIG. 3) on motherboard 10 via a right angle riser 66. LCNP4 card 62 functions to provide and send control and data signals between motherboard 10 and the LCN subsystem as explained above. Additional information regarding the functionality of the LCNP4 card may be had by reference to U.S. Pat. No. 5,805,844 and U.S. Pat. No. 5,867,673, assigned to Honeywell Inc., both hereby incorporated by reference.

COTS computer 12 as well as the other components disposed on motherboard 10 are interconnected to a proprietary bus of proprietary system 100 via adapter boards 32 and 34 and backplane 102. Adapter board 32 is mounted to frame surface 72 and includes a pair of edge connectors 76 and 78. Edge connector 78 has conductive portions that interconnect proprietary power supply 45 of proprietary system 100 to computer apparatus 50. The power signals are carried from adapter board 32 via a cable 83 to power converter circuit 40. Power converter circuit 40, which is located on computer apparatus 50, converts the voltage and currents provided by power supply 45 to the power and current required by the motherboard 10. Edge connector 76, has conductive portions that interconnect the proprietary LCN I/O control and data bus to the LCNP4 co-processor card 62, as well as, to an LCNP4 I/O connection (not shown). It should be noted that depending on the type of proprietary system 100 to be connected to computer apparatus 50, LCNP4 co-processor card 62 may not be used. Therefore, the present invention is not limited to its use herein. Computer apparatus 50 can function effectively to control proprietary peripherals or proprietary operator stations of other networks without the use of LCNP4 card 62.

Adapter board 34 includes an edge connector 80 that, e.g., may have 72 pins. Edge connector 80 interconnects the I/O signals to and from the motherboard 10 and I/O unit 104. Adapter board 34 is mounted to frame surface 72 on standoffs 82 at a level that is parallel to motherboard 10. Adapter board 34 is interconnected with motherboard 10 via a cable 84 that carries outgoing signals to and incoming signals from I/O unit 104, as well as, optionally, video signals, USB and Ethernet signals. Edge connector 80 interconnects these signals with I/O unit 104 via backplane 102. The incoming signals are connected to the appropriate and associated connectors on motherboard 10.

Figure 5:
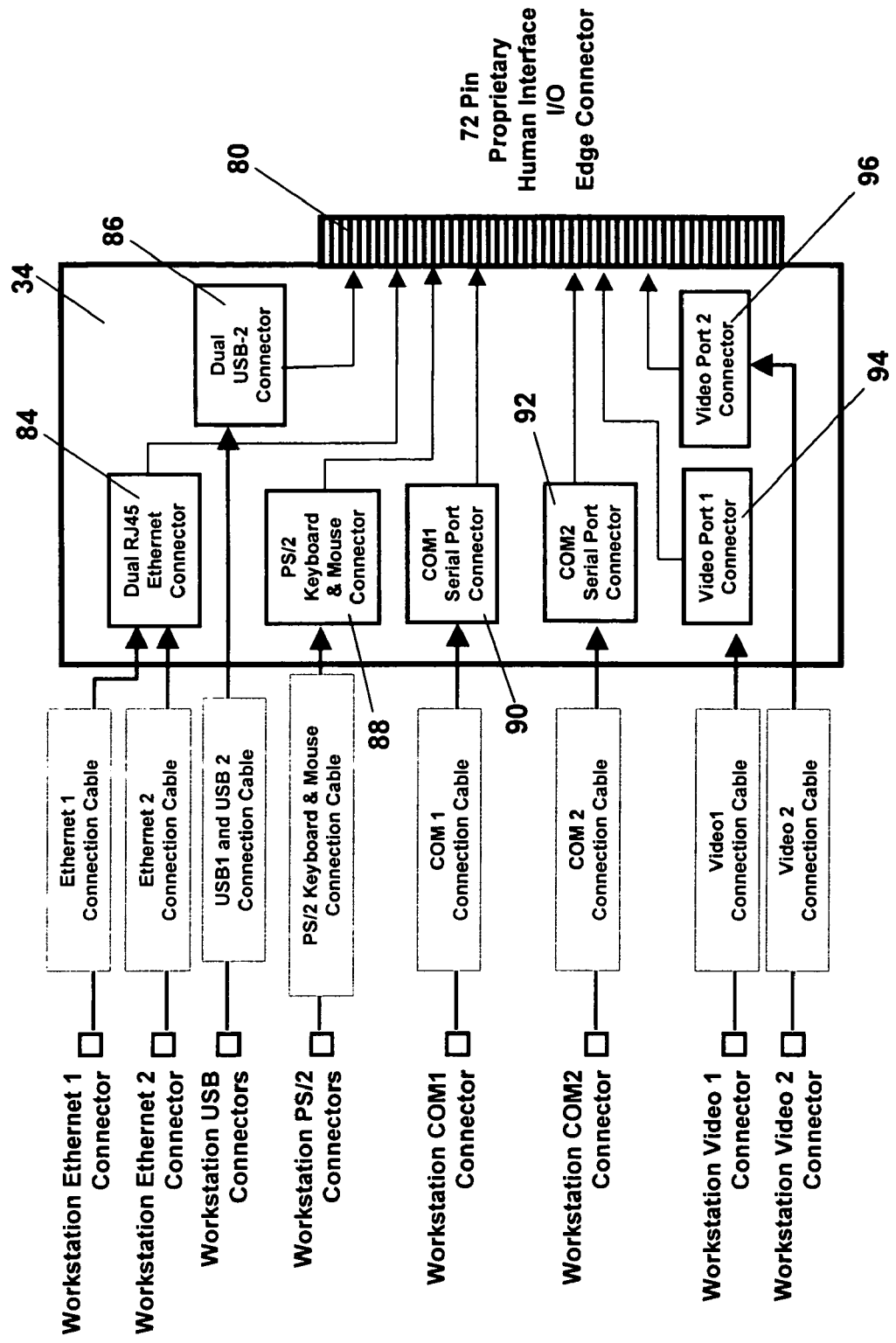
FIG. 5 is a block diagram of an adapter board of the computer apparatus of FIGS. 1 and 2.

Referring to FIG. 5, adapter board 34 includes a dual RJ45 Ethernet connector 84 and a dual USB-2 connector 86. RJ45 Ethernet connector 84 carries the Ethernet signals received on Ethernet connection cable 1 and Ethernet connection cable 2 from motherboard 10 to edge connector 80. USB-2 connector 86 carries the USB signals received on an USB connection cable from motherboard 10 to edge connector 80. A PS/2 keyboard and mouse connector 88 carries the signals received on a PS/2 keyboard and mouse connection cable from motherboard 10 to edge connector 80. A COM 1 serial port connector 90 and a COM 2 serial port connector 92 carry COM 1 and COM 2 signals received on COM 1 and COM 2 connection cables, respectively, to edge connector 80. A video port 1 connector 94 and a video port 2 connector 96 carry the signals received on video 1 and video 2 connection cables, respectively, from motherboard 10 to edge connector 80.

The interconnections between adapter board 34 and the various motherboard I/O connectors can be made by a plurality of ribbon cables. However, those skilled in the art will understand that other methods could be used in the making these interconnections and the invention is not limited thereto.

Computer apparatus 50 can be mounted in a TDC3000 cabinet along with other proprietary components of proprietary system 100, or alternatively, in the universal operator station of a proprietary TDC3000 operator console.

The present invention having been thus described with particular reference to the preferred forms thereof, it will be obvious that various changes and modifications may be made therein without departing from the spirit and scope of the present invention as defined in the appended claims.

What is claimed is:

1. A computer apparatus comprising:
a proprietary system comprising at least one input/output (I/O) unit and a backplane that includes a plurality of card slots for an interface to said I/O unit, wherein said I/O unit comprises a circuit card chassis located in said I/O unit;
a commercial-off the shelf (COTS) computer;
a frame that fits in said circuit card chassis;
at least one edge connector, wherein said COTS computer and said edge connector are disposed on said frame; and
at least one adapter that is disposed on said frame and that is interconnected with said COTS computer and said edge connector;
wherein said adapter comprises circuit elements that convert input and output of signals of said COTS computer to input and output signals that are compatible with said interface so that said COTS computer provides control for said I/O unit, and wherein said edge connector mates with one of said card slots of said backplane.

2. The computer apparatus of claim 1, wherein said at least one adapter is a first adapter and said edge connector is a first edge connector, and further comprising a second edge connector disposed on said frame and a second adapter that is disposed on said frame and that is interconnected with said COTS computer and said second edge connector.

3. The computer apparatus of claim 2, wherein said first adapter and said first edge connector are disposed on a first adapter board that is mounted to and spaced from said frame, and wherein said second edge connector and said second adapter are disposed on a second adapter board, and wherein said second edge connector mates with another of said card slots of said backplane.

4. The computer apparatus of claim 3, wherein said frame comprises a metallic sheet comprising a first surface and a second surface substantially perpendicular to the first surface, wherein said second surface provides support for said second adapter board.

5. The computer apparatus of claim 1, further comprising a power converter disposed on said frame, wherein said power converter is interconnected with said edge connector, said COTS computer and said adapter to convert power received via said edge connector from said system to power levels that are compatible with said COTS computer and said adapter.

* * * * *